United States Patent
Smith et al.

(10) Patent No.: US 10,121,038 B2
(45) Date of Patent: Nov. 6, 2018

(54) DYNAMIC BARCODE TICKETING CARRYING ENCRYPTED VALIDATION TRANSACTIONS

(71) Applicant: Cubic Corporation, San Diego, CA (US)

(72) Inventors: Gavin Smith, Crawley (GB); Tom Vilhelmsen, Holbaek (DK)

(73) Assignee: Cubic Corporation, San Diego, CA (US)

(*) Notice: Subject to any disclaimer, the term of this patent is extended or adjusted under 35 U.S.C. 154(b) by 0 days.

(21) Appl. No.: 15/919,526

(22) Filed: Mar. 13, 2018

(65) Prior Publication Data

US 2018/0268182 A1    Sep. 20, 2018

Related U.S. Application Data

(60) Provisional application No. 62/471,297, filed on Mar. 14, 2017.

(51) Int. Cl.
   *G06K 7/14*    (2006.01)
   *G07C 9/00*    (2006.01)
   *H04L 9/32*    (2006.01)

(52) U.S. Cl.
   CPC ........ *G06K 7/1413* (2013.01); *G07C 9/00111* (2013.01); *H04L 9/32* (2013.01)

(58) Field of Classification Search
   None
   See application file for complete search history.

(56) References Cited

U.S. PATENT DOCUMENTS

| 8,118,223 | B2 | 2/2012 | Hammad | |
|---|---|---|---|---|
| 2015/0025921 | A1 | 1/2015 | Smith | |
| 2016/0042485 | A1 | 2/2016 | Kopel | |
| 2017/0316626 | A1* | 11/2017 | Smith | G07C 9/00087 |
| 2017/0337550 | A1* | 11/2017 | Aparicio Ruiz | G06Q 20/385 |

FOREIGN PATENT DOCUMENTS

| CA | 2805681 A1 | 8/2013 |
|---|---|---|
| WO | 2011-006140 A2 | 1/2011 |
| WO | 2012-158058 A1 | 11/2012 |

OTHER PUBLICATIONS

International Search Report and Written Opinion of PCT/US2018/022327 dated Jun. 6, 2018, all pages.

\* cited by examiner

*Primary Examiner* — Kristy A Haupt
(74) *Attorney, Agent, or Firm* — Kilpatrick Townsend & Stockton

(57) ABSTRACT

Systems, methods, and devices for conducting a secure ticketing transaction at a first location within a transit system. A media reader described herein may include a barcode reader, a barcode display, and processor(s). The processor(s) may be configured to perform operations including receiving a key for performing encryption or decryption of data, reading, from a display of a mobile communication device, an encrypted first barcode to obtain encrypted first barcode data, decrypting the encrypted first barcode data to obtain first barcode data, generating second barcode data indicating entry information, encrypting the second barcode data to obtain encrypted second barcode data, displaying an encrypted second barcode containing the encrypted second barcode data, and allowing the transit customer to enter the transit system at the first location.

17 Claims, 12 Drawing Sheets

DYNAMIC BARCODE TICKETING CARRYING ENCRYPTED VALIDATION TRANSACTIONS

CROSS-REFERENCES TO RELATED APPLICATIONS

This Application claims priority to U.S. Provisional Patent Application No. 62/471,297 filed Mar. 14, 2017, the entire disclosure of which is hereby incorporated by reference, for all purposes, as if fully set forth herein.

BACKGROUND OF THE INVENTION

As populations in the world's largest city centers continue to grow, often at an exponential rate, public and private transportation systems are becoming increasingly burdened with increased ridership and transit stations are becoming increasingly congested, causing delays to transit users and increased costs to the transportation systems. The use of sophisticated communication devices presents an appealing approach for managing such overcrowding. Unfortunately, existing devices and approaches are insufficient to alleviate these problems. Accordingly, new systems, methods, and other techniques are needed.

BRIEF SUMMARY OF THE INVENTION

In a first aspect of the present disclosure, a media reader for conducting a secure ticketing transaction at a first location within a transit system is provided. The media reader may include a barcode reader. The media reader may also include a barcode display. The media reader may further include one or more processors communicatively coupled to the barcode reader and the barcode display. In some embodiments, the one or more processors are configured to perform operations including receiving a key for performing encryption or decryption of data. The operations may also include reading, from a display of a mobile communication device of a transit customer, an encrypted first barcode to obtain encrypted first barcode data. The operations may further include decrypting the encrypted first barcode data to obtain first barcode data. In some embodiments, the first barcode data indicates a request of the transit customer to enter the transit system at the first location. In some embodiments, the operations include generating second barcode data indicating entry information. The operations may also include encrypting the second barcode data to obtain encrypted second barcode data. The operations may further include displaying an encrypted second barcode containing the encrypted second barcode data. In some embodiments, the operations include allowing the transit customer to enter the transit system at the first location.

In some embodiments, the entry information includes one or more of the first location, a current time, and an identifier corresponding to the transit customer. In some embodiments, the operations include reading, from the display of the mobile communication device, an encrypted third barcode to obtain encrypted third barcode data and decrypting the encrypted third barcode data to obtain third barcode data. In some embodiments, the third barcode data indicates that the encrypted second barcode was successfully read by the mobile communication device. In some embodiments, a second media reader at a second location within the transit system is configured to read, from the display of the mobile communication device, an encrypted fourth barcode to obtain encrypted fourth barcode data, decrypt the encrypted fourth barcode data to obtain fourth barcode data, the fourth barcode data indicating a request of the transit customer to exit the transit system at the second location, calculate a fare based on the first location and the second location, and allow the transit customer to exit the transit system at the second location.

In some embodiments, the second media reader is further configured to read, from the display of the mobile communication device, an encrypted fifth barcode to obtain encrypted fifth barcode data and decrypt the encrypted fifth barcode data to obtain fifth barcode data, the fifth barcode data indicating that the fare was successfully paid. In some embodiments, the key is generated remote to the media reader and the mobile communication device. In some embodiments, allowing the transit customer to enter the transit system at the first location includes one or more of removing a physical barrier at the first location and facilitating access through a gateless entry at the first location.

In a second aspect of the present disclosure, a method of conducting a secure ticketing transaction by authenticating a transit customer's identity is provided. The method may include receiving, by a first media reader at a first location within a transit system, a key for performing encryption or decryption of data. The method may also include reading, by the first media reader from a display of a mobile communication device of a transit customer, an encrypted first barcode to obtain encrypted first barcode data. The method may further include decrypting, by the first media reader, the encrypted first barcode data to obtain first barcode data, the first barcode data indicating a request of the transit customer to enter the transit system at the first location. In some embodiments, the method includes generating, by the first media reader, second barcode data indicating entry information. The method may also include encrypting, by the first media reader, the second barcode data to obtain encrypted second barcode data. The method may further include displaying, by the first media reader, an encrypted second barcode containing the encrypted second barcode data. In some embodiments, the method includes allowing the transit customer to enter the transit system at the first location.

In a third aspect of the present disclosure, a non-transitory computer-readable medium comprising instructions that, when executed by one or more processors, cause the one or more processors to perform the method described above.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Embodiments of the present disclosure include systems, methods, and other techniques for conducting a secure ticketing transaction within a transit system by authenticating a transit customer's identity using encrypted barcodes. The encrypted barcodes may include, for example, an entry transaction that documents a time and a location associated with a transit customer's entering the transit system. Embodiments can be employed in other ticketing systems or even non-ticketing systems, e.g., in payment systems to pay for anything where the resultant charge is dependent on where or when the service began. Alternative embodiments may utilize device types other than a mobile phone and/or visual identifiers other than barcodes, depending on the desired functionality.

In some embodiments, smart barcode ticket validators covertly pass encrypted entry validation transactions in a passenger's smartphone for delivery to the exit validator to provide trustable evidence of the entry time and location to ensure the correct fare is charged. Then the exit gate instructs the phone's ticketing app to pay the fare using mobile credit before allowing exit. Embodiments of the present disclosure may utilize techniques that hide a transit entry transaction inside a confirmation barcode passed back to the initiating smartphone app. The hidden transaction may be later read by another transit read on exit enabling it to calculate the fare relevant for the journey taken. Payment may then be confirmed by the app before the exit reader allows the passenger to leave the system.

Among other advantages, embodiments of the present disclosure allow for a passenger's own mobile phone (or similar device) to be used as the carrier of transactions so there is no need for a transit system to have to invest in a large smartcard stock. Additionally, embodiments of the present disclosure allow passengers unable or unwilling to use contactless credit cards to travel on a smart-only transit system using dynamic barcodes and to pay with their mobile phone credit.

Figure 1:
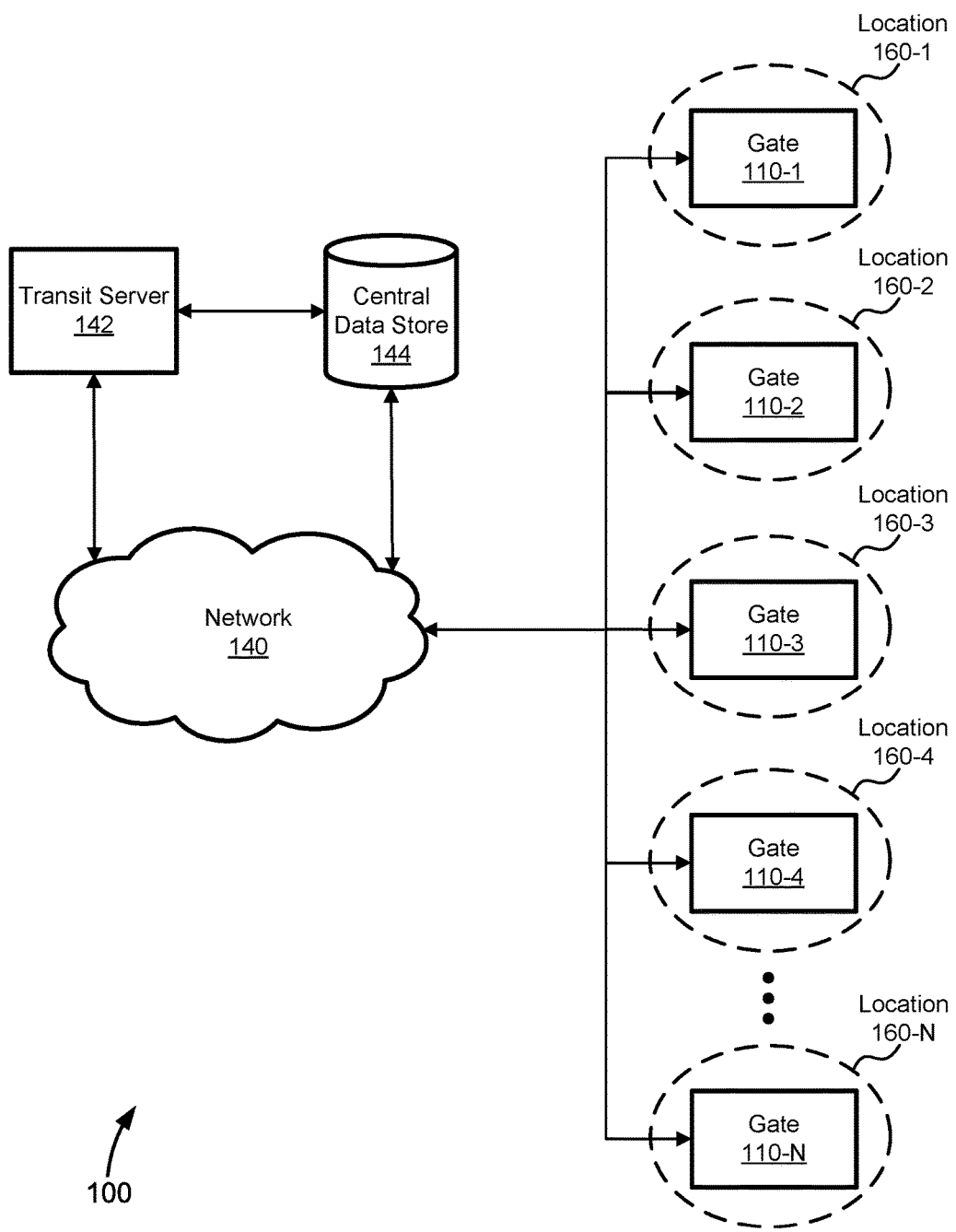
FIG. 1 illustrates a block diagram of a transit system, according to some embodiments of the present disclosure.

FIG. 1 illustrates a block diagram of a transit system 100, according to some embodiments of the present disclosure. Transit system 100 may include a plurality of gates 110 located at a plurality of locations 160 (also referred to herein as transit locations 160). Each of locations 160 may include a non-restricted access area and a restricted access area. The non-restricted access area may include areas that are freely accessible to the general public, whereas the restricted access area may be reserved exclusively for customers of transit system 100. Examples of a restricted access area may include: the inside of a bus or train, a bus or train platform, the inside of a bus or train station, and the like. Each of locations 160 may include a single or multiple gates 110, and in some embodiments each of gates 110 may include an entry point that defines a passageway and separates the non-restricted access area from the restricted access area. Each of gates 110 may be communicatively coupled to a network 140 via one or more wired and/or wireless connections. Transit system 100 may also include a transit server 142 and a central data store 144, each of which being communicatively coupled to network 140. Transit server 142 may include a single or multiple processors, and may write, retrieve, or store data to central data store 144 or any of gates 110. Although embodiments herein are described in reference to transit systems, the restricted access area may correspond to an entertainment venue, a building, or any location involving metered access.

Figure 2:
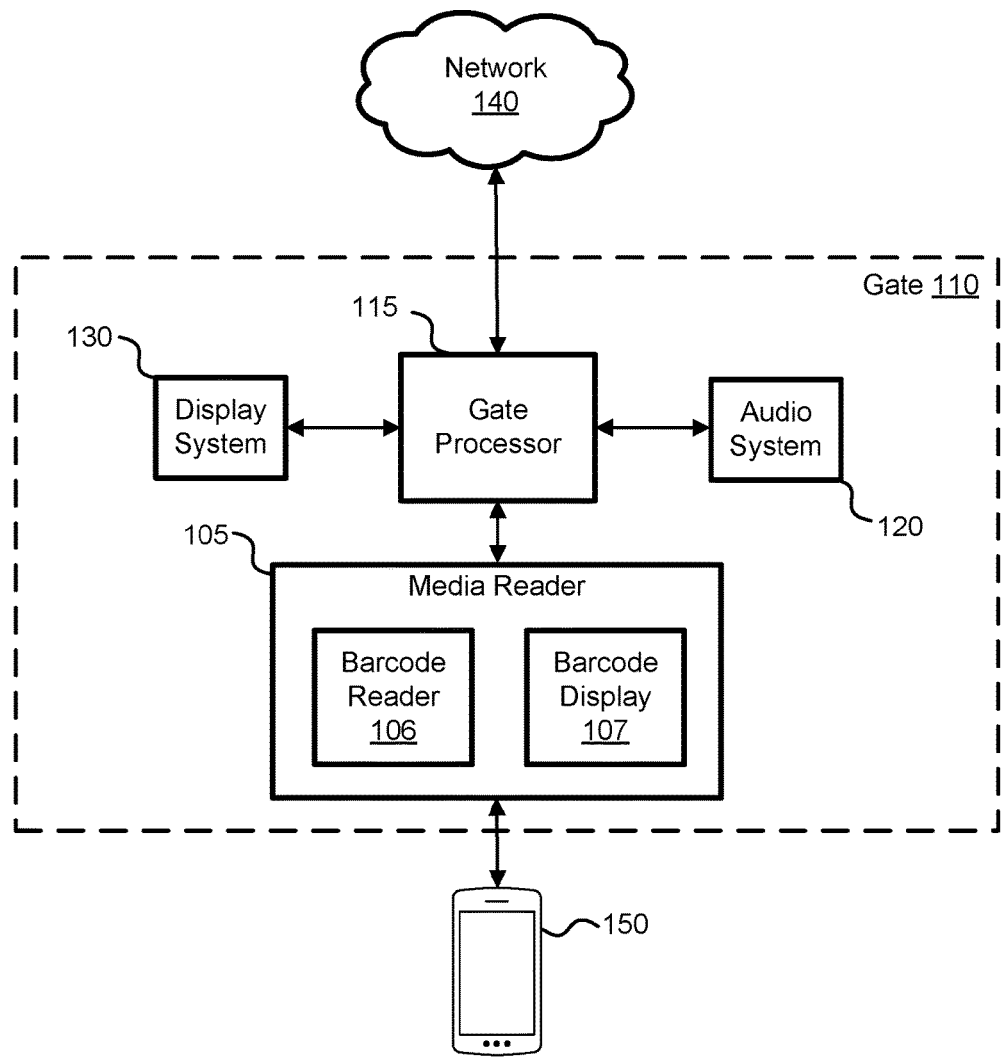
FIG. 2 illustrates a block diagram of a mobile communication device in communication with a gate in communication with a network, according to some embodiments of the present disclosure.

FIG. 2 illustrates a block diagram of a mobile communication device 150 in communication with gate 110 in communication with network 140, according to some embodiments of the present disclosure. Gate 110 may be used as an entry point into transit system 100 (i.e., the restricted access area of transit system 100). One of ordinary skill in the art will recognize that gate 110 can vary in appearance and functionality. In some embodiments, gate 110 includes a media reader 105 whereby mobile communication device 150 does not have to make contact with media reader 105 to communicate. For example, media reader 105 may include a barcode reader 106 and a barcode display 107. In some embodiments, gate 110 includes an audio system 120. Audio system 120 can give verbal instructions on using any of the components of gate 110. For instance, in some embodiments audio system 120 can alert the holder of mobile communication device 150 that mobile communication device 150 is not correctly placed to communicate with media reader 105.

In some embodiments, gate 110 includes a gate processor 115 in communication with network 140. Gate processor 115 may include a single or multiple processors and an associated memory. Gate processor 115 may communicate with a display system 130 and provide the messaging presented on display system 130. Gate processor 115 can generate the messages to be displayed on display system 130 or receive the message to be displayed from any number of sources over network 140. Gate processor 115 may also communicate with audio system 120 and may generate the messages broadcast from audio system 120 or receive the message to be broadcast from any number of sources over the network 140. Gate processor 115 may communicate with media reader 105 and may determine if mobile communication device 150 allows passage or may send information received from mobile communication device 150 over network 140 to transit server 142 to make the determination. In response to a communication error between media reader 105 and mobile communication device 150, gate processor 115 may communicate with media reader 105 and relay information from and to the other systems such as to audio system 120 to give an audio indication that mobile communication device 150 is not correctly placed or to display system 130 to show where mobile communication device 150 should be placed.

In some embodiments, display system 130 may display a message for the holder of mobile communication device 150 that the fare media is not in the correct place and can identify to the holder of mobile communication device 150 where to correctly place mobile communication device 150 to allow proper communication. In some embodiments, display system 130 can display any manner of other messages including instructions for using gate 110, instructions for using transit system 100, and advertising. In some embodiments, gate 110 may include a media reader that requires contact with the object to be read. One of skill in the art will recognize that barriers associated with gate 110 would open up to allow the holder of mobile communication device 150 passage upon a successful communication between media reader 105 and mobile communication device 150.

In some embodiments, each of media reader 105 and mobile communication device 150 may be configured to read and display barcodes containing encrypted or unencrypted data. For example, barcode display 107 may display a barcode that may be read by a barcode reader of mobile communication device 150, and conversely, a barcode display of mobile communication device 150 may display a barcode that may be read by barcode reader 106. The barcode displays of media reader 105 and mobile communication device 150 may include any type of electronic display. The barcode readers of media reader 105 and mobile communication device 150 may include cameras, laser scanners, charge-coupled device (CCD) readers, among other possibilities. In one particular implementation, mobile communication device 150 is a smart phone having a camera and digital display that are used as a barcode reader and barcode display, respectively.

In some embodiments, communication between media reader 105 and mobile communication device 150 may include any communication technology employing electromagnetic wireless signals. For example, the two devices may communicate using near-field communication (NFC), Bluetooth low energy (BLE), radio-frequency identification (RFID), and the like. In some embodiments, media reader 105 may include an RFID reader and mobile communication device 150 may include an RFID tag. The RFID tag may be may be passive, active, or battery-assisted passive. Active RFID tags have on-board batteries and periodically or constantly transmit wireless signals with identifying information. Battery-assisted passive RFID tags have small batteries on board and are activated when they are near an RFID reader. Passive RFID tags lack on-board batteries and are instead energized by the wireless signals received from RFID readers. RFID tags may have individual serial numbers or IDs that allow each individual RFID tag to be identified from among a larger group. In some embodiments, an RFID tag may be a credit card sized carrier or a key fob. RFID tags may operate in a 13.56 MHz band (HF), a 900 MHz band (UHF), or a 2.4 GHz band, among others. In some embodiments, UHF tags may co-exist with HF tags and vice-versa. In some embodiments, active RFID tags may be turned on and off by a user pressing a button on or near the RFID tag. For example, a wheelchair user may press a button fixed to their wheelchair to power an active RFID tag. Such embodiments may save power and preserve battery life.

In some embodiments, mobile communication device 150 may include (directly or indirectly via e.g., information linking to an external location) an amount of units which may be used to access transit system 100. For example, passage through different routes within transit system 100 may cause different amounts of units to be deleted from mobile communication device 150 (or from the external location). In some embodiments, transit server 142 or some external processor may cause some portion of the amount of units to be held as unavailable. When a portion of units is held as unavailable, that portion may not be used for other purposes outside transit system 100 such that the portion is locked from usage. In one particular implementation, the amount of units may correspond to money (e.g., a cash amount) usable for financial transactions such as purchase of a fare within transit system 100. In various embodiments, mobile communication device 150 may be a smart phone, a personal digital assistant (PDA), or a tablet. In some embodiments, mobile communication device 150 may be used in place of a payment card (e.g., credit card, debit card, card issued by transit system 100, etc.).

Figure 3:
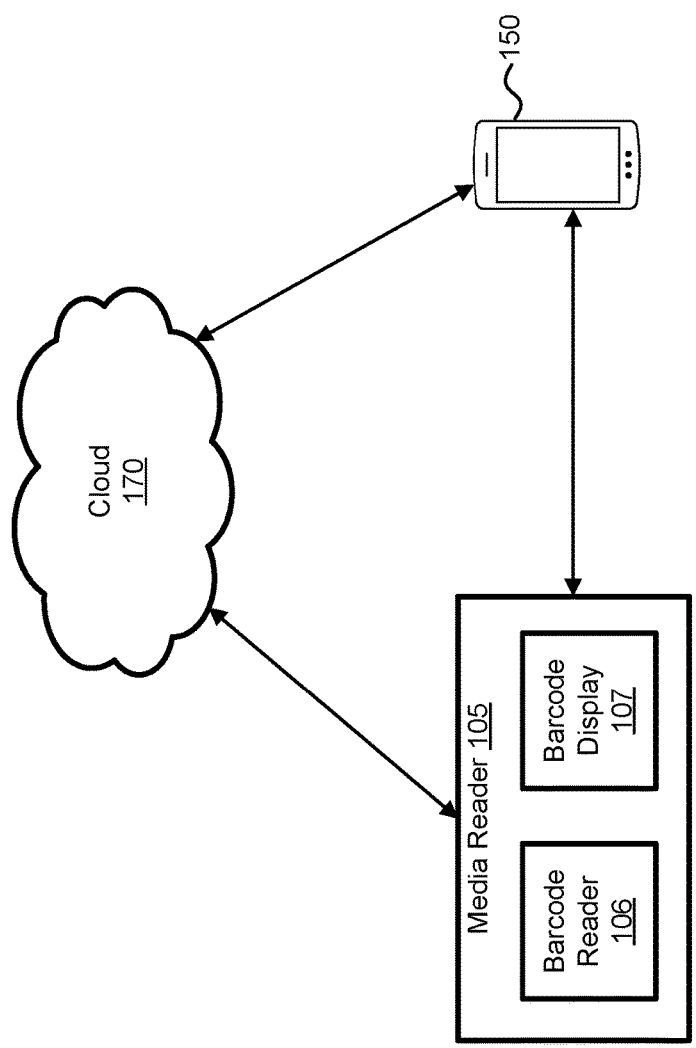
FIG. 3 illustrates a block diagram of a mobile communication device in communication with a media reader in communication with a cloud, according to some embodiments of the present disclosure.

FIG. 3 illustrates a block diagram of mobile communication device 150 in communication with media reader 105 in communication with a cloud 170, according to some embodiments of the present disclosure. Communication between media reader 105 and cloud 170 may include any wired or wireless communication technology. In one particular implementation, media reader 105 may send and/or receive data from cloud 170 using transit server 142 and/or network 140. For example, transit server 142 may receive data from cloud 170 and send the data to media reader 105 using network 140. Communication between mobile communication device 150 and cloud 170 may include any wired or wireless communication technology. In one particular implementation, mobile communication device 150 may send and/or receive data from cloud 170 using a cellular network.

Figure 4A:
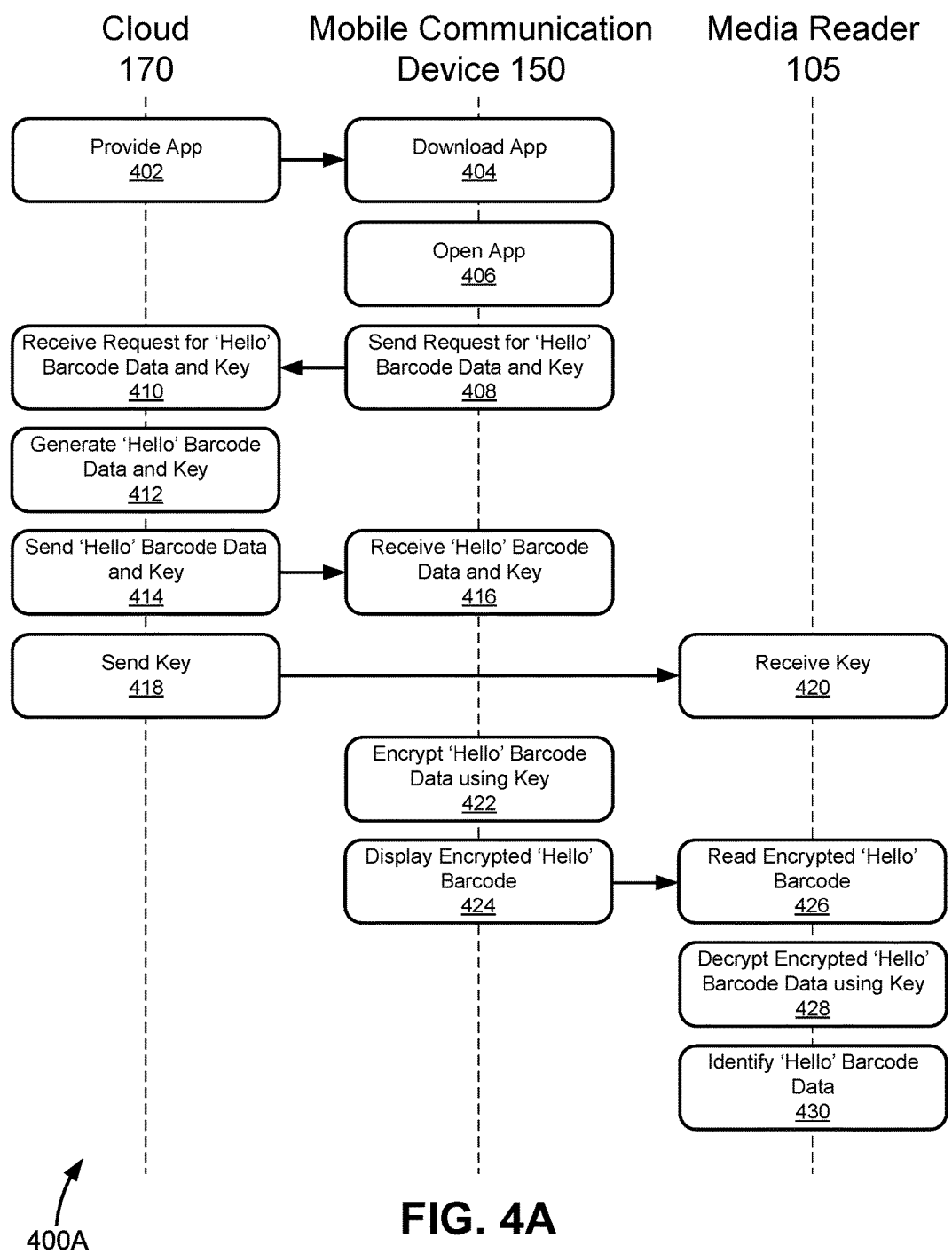
FIGS. 4A-4C illustrate a method of conducting a secure ticketing transaction by authenticating a transit customer's identity, according to some embodiments of the present disclosure.
Figure 4B:
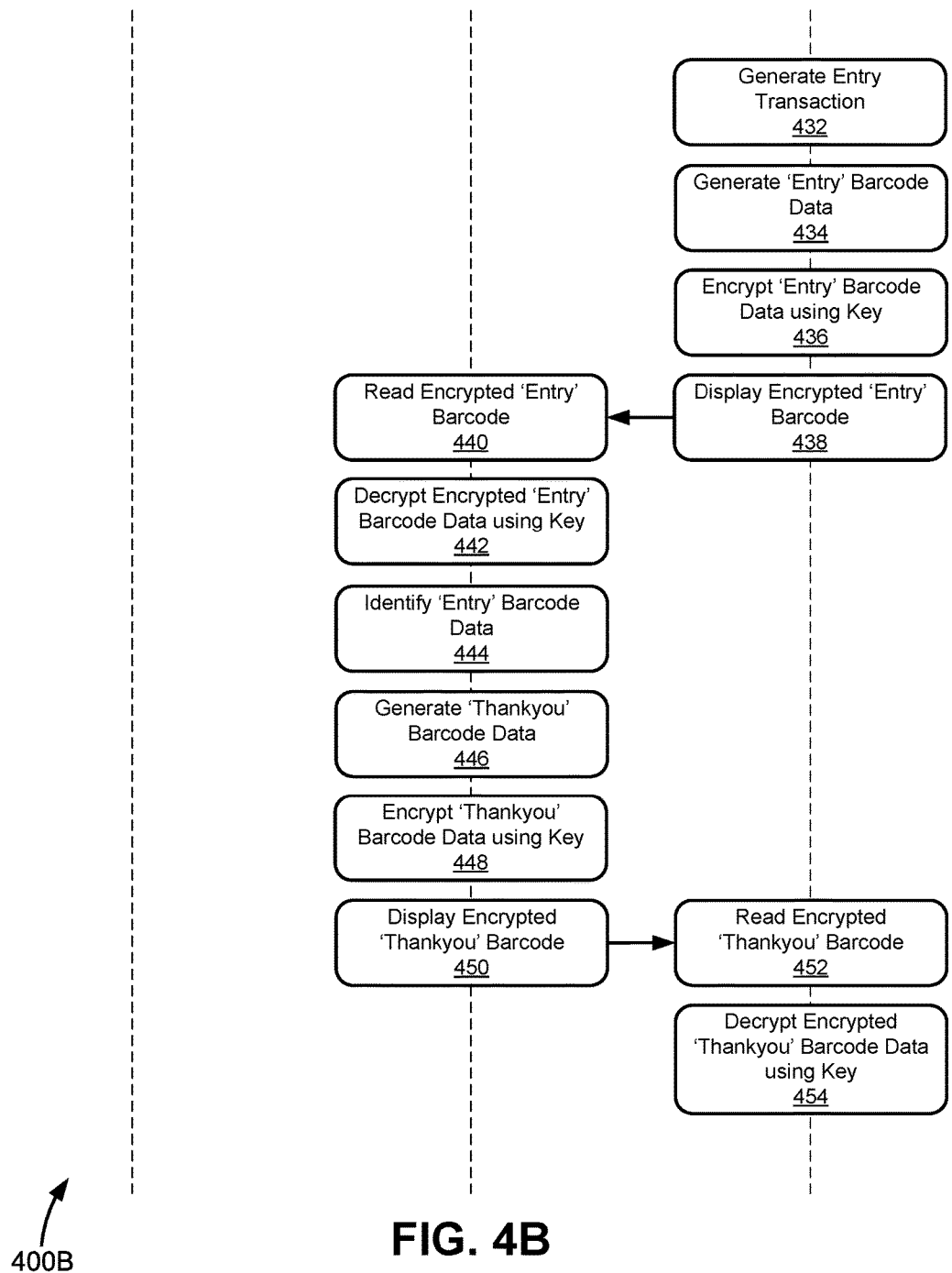
Figure 4C:
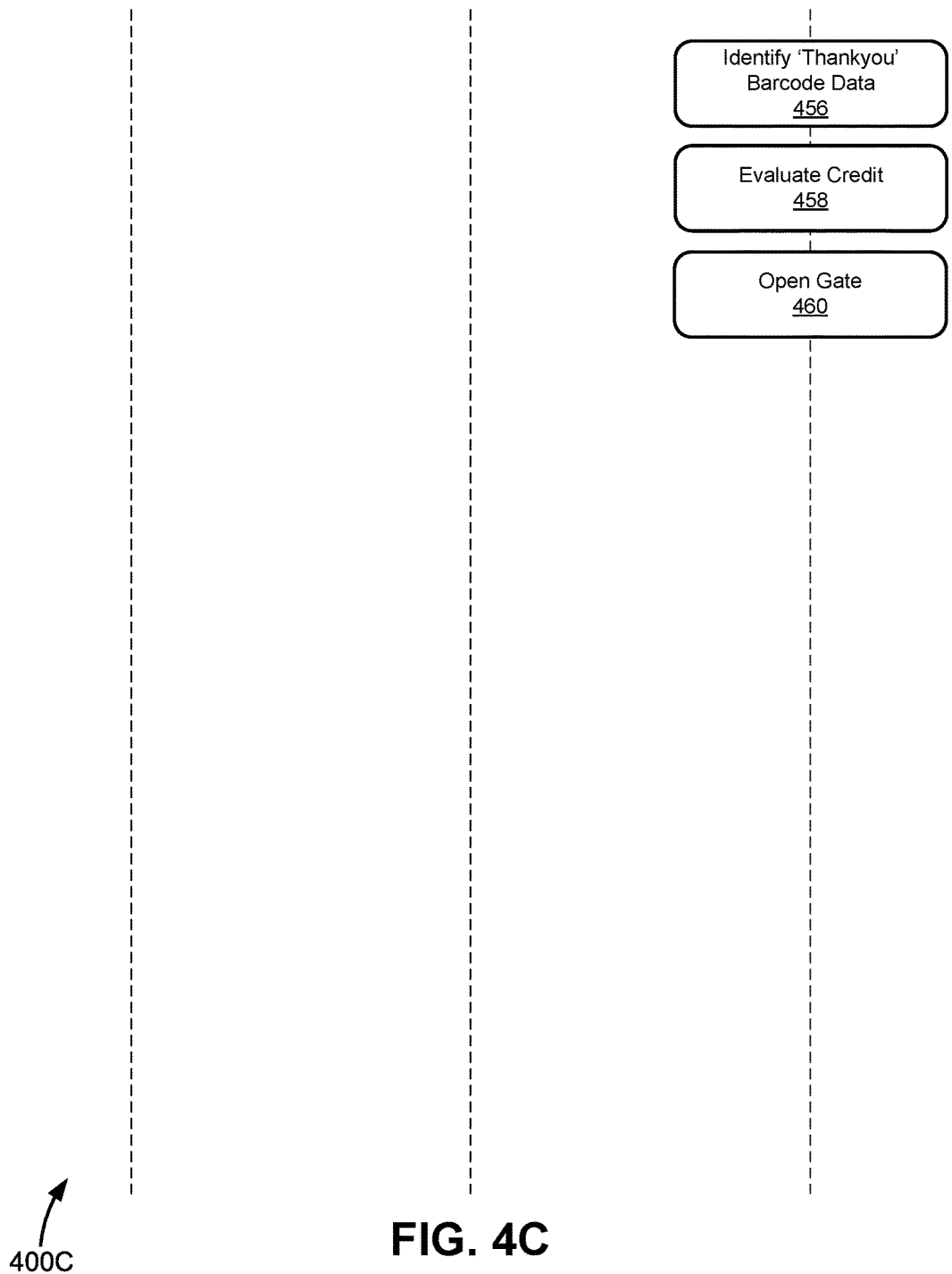
Figure 5:
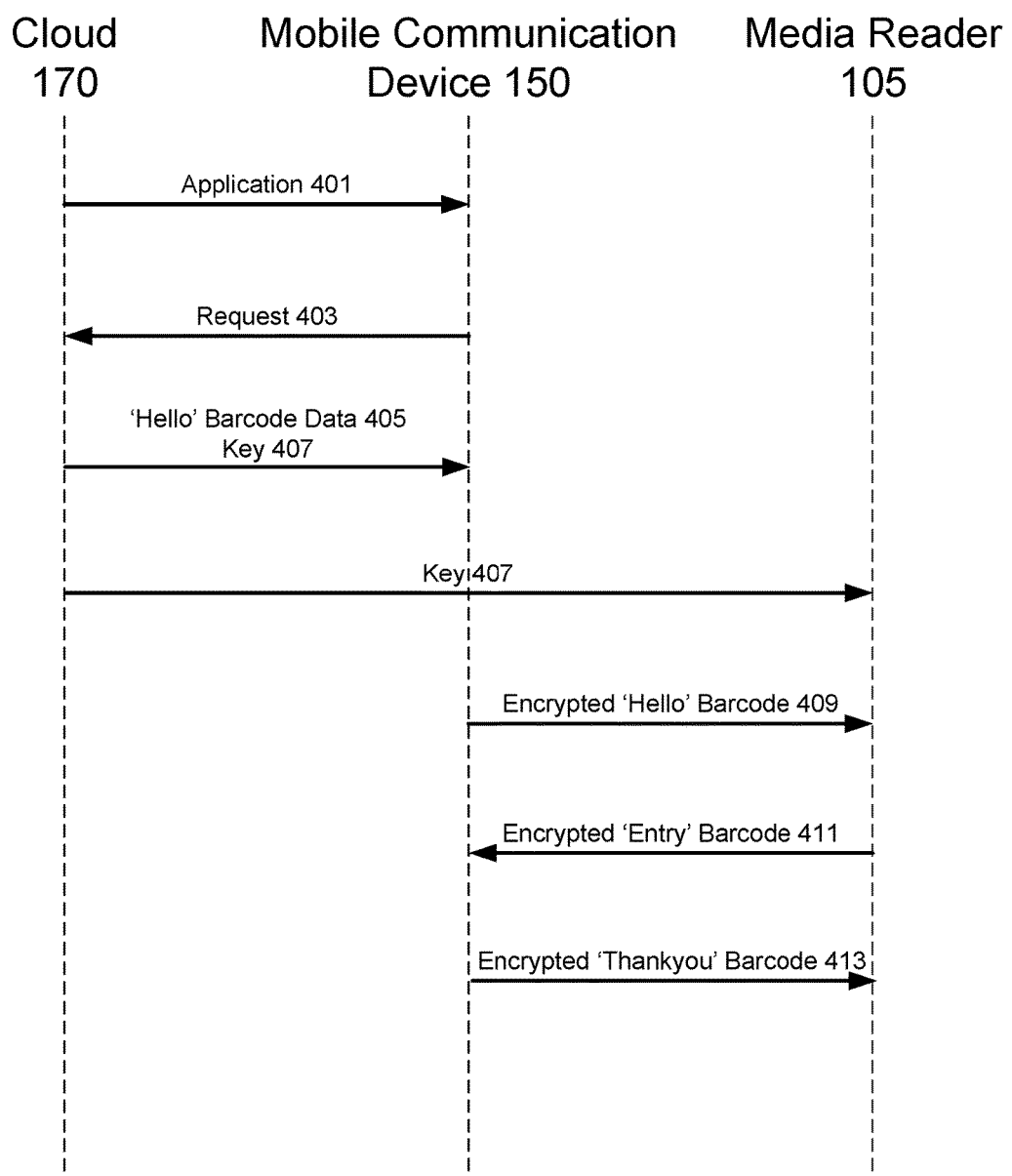
FIG. 5 illustrates a simplified diagram of the information exchanged during performance of a method, according to some embodiments of the present disclosure.

FIGS. 4A-4C illustrate a method 400 of conducting a secure ticketing transaction by authenticating a transit customer's identity, according to some embodiments of the present disclosure. Specifically, method 400 may be used to register mobile communication device 150 within transit system 100 so that a transit customer may enter a restricted access area within transit system 100. Steps of method 400 need not be performed in the order shown, and not all steps of method 400 need be performed during performance of method 400. In describing steps of method 400, reference will also be made to FIG. 5 illustrating a simplified diagram of the information exchanged during performance of method 400.

At step 402, an application 401 is provided by cloud 170 or is provided through or using cloud 170. At step 404, application 401 is downloaded by mobile communication device 150 from cloud 170 using, for example, an application store. In some embodiments, step 404 may be performed concurrently or simultaneously with step 402.

At step 406, application 401 is opened by mobile communication device 150. Application 401 may be manually opened by the holder of mobile communication device 150 or may be automatically opened in response to detection of mobile communication device 150 being within a threshold distance of media reader 105 or automatically in response to downloading application 401.

At step 408, a request 403 for 'Hello' barcode data 405 (alternatively referred to herein as first barcode data) and key 407 is sent by mobile communication device 150 to cloud 170. At step 410, request 403 for 'Hello' barcode data 405 and key 407 is received by cloud 170 from mobile communication device 150. In some embodiments, step 410 may be performed concurrently or simultaneously with step 408. Key 407 may be an encryption key comprising a random string of bits generated by cloud 170. Key 407 may be used to encrypt/convert data into an undecipherable version of the same data. After encrypting a particular set of data using key 407, the same data may be recovered via subsequent decryption using key 407.

At step 412, 'Hello' barcode data 405 and key 407 are generated by cloud 170. In some embodiments, key 407 may be generated in response to receiving request 403. In other embodiments, key 407 is retrieved from a database of pre-generated keys. At step 414, 'Hello' barcode data 405 and key 407 are sent by cloud 170 to mobile communication device 150. At step 416, 'Hello' barcode data 405 and key 407 are received by mobile communication device 150 from cloud 170. In some embodiments, step 416 may be performed concurrently or simultaneously with step 414.

At step 418, key 407 is sent by cloud 170 to media reader 105. In some embodiments, step 418 may be performed concurrently or simultaneously with step 414. At step 420, key 407 is received by media reader 105 from cloud 170. In some embodiments, step 420 may be performed concurrently or simultaneously with steps 418 and/or 416. After performing each of steps 414 and 418, cloud 170 may erase key 407 such that it is non-recoverable by cloud 170.

At step 422, 'Hello' barcode data 405 is encrypted by mobile communication device 150 using key 407. At step 424, encrypted 'Hello' barcode 409 is displayed by mobile communication device 150. At step 426, encrypted 'Hello' barcode 409 is read by media reader 105 using barcode reader 106. In some embodiments, step 426 may be performed concurrently or simultaneously with step 424.

At step 428, encrypted 'Hello' barcode data is decrypted by media reader 105 using key 407 to recover 'Hello' barcode data 405. At step 430, 'Hello' barcode data 405 is identified by media reader 105. Identifying 'Hello' barcode data 405 may include comparing 'Hello' barcode data 405 to a database containing a list of acceptable barcode data that includes 'Hello' barcode data 405. Upon identifying 'Hello' barcode data 405, media reader 105 may determine the transit customer's identity and may also determine that the transit customer is attempting to conduct a secure ticketing transaction involving an entry into transit system 100.

At step 432, an entry transaction is generated by media reader 105. The entry transaction may be a record that includes an entry time, an entry location, and the transit customer's identity. In some embodiments, the entry transaction includes media reader 105 (i.e., the specific media reader or gate used to enter transit system 100). At step 434, 'Entry' barcode data (alternatively referred to herein as second barcode data) is generated by media reader 105. The 'Entry' barcode data includes the entry transaction. At step 436, the 'Entry' barcode data is encrypted by media reader 105 using key 407.

At step 438, encrypted 'Entry' barcode 411 is displayed by media reader 105 using barcode display 107. At step 440, encrypted 'Entry' barcode 411 is read by mobile communication device 150. In some embodiments, step 440 may be performed concurrently or simultaneously with step 438. At step 442, encrypted 'Entry' barcode data is decrypted by mobile communication device 150 using key 407. At step 444, the 'Entry' barcode data is identified by mobile communication device 150. Identifying the 'Entry' barcode data may include comparing the 'Entry' barcode data to a database containing a list of acceptable barcode data that includes the 'Entry' barcode data. Upon identifying 'Entry' barcode data, mobile communication device 150 may determine that media reader 105 has determined the transit customer's identity using key 407 and has created the entry transaction. Mobile communication device 150 may extract the data from the entry transaction to verify correctness.

At step 446, 'Thankyou' barcode data (alternatively referred to herein as third barcode data) is generated by mobile communication device 150. At step 448, the 'Thankyou' barcode data is encrypted by mobile communication device 150. At step 450, encrypted 'Thankyou' barcode 413 is displayed by mobile communication device 150. At step 452, encrypted 'Thankyou' barcode 413 is read by media reader 105 using barcode reader 106. In some embodiments, step 452 may be performed concurrently or simultaneously with step 450. At step 454, encrypted 'Thankyou' barcode data is decrypted by media reader 105 using key 407. At step 456, the 'Thankyou' barcode data is identified by media reader 105. Identifying the 'Thankyou' barcode data may include comparing the 'Thankyou' barcode data to a database containing a list of acceptable barcode data that includes the 'Thankyou' barcode data.

At step 458, the credit associated with mobile communication device 150 is evaluated by media reader 105. Evaluating the credit may include determining that the credit associated with mobile communication device 150 is greater than a minimum fare associated with transit system 100. The minimum fare may be determined based on transit location 160. At step 460, the transit customer associated with mobile communication device 150 is allowed to access the restricted access area. Allowing the transit customer to access the restricted access area may include removing a physical barrier associated with gate 110 and/or causing an alarm signal to not be activated.

Figure 6A:
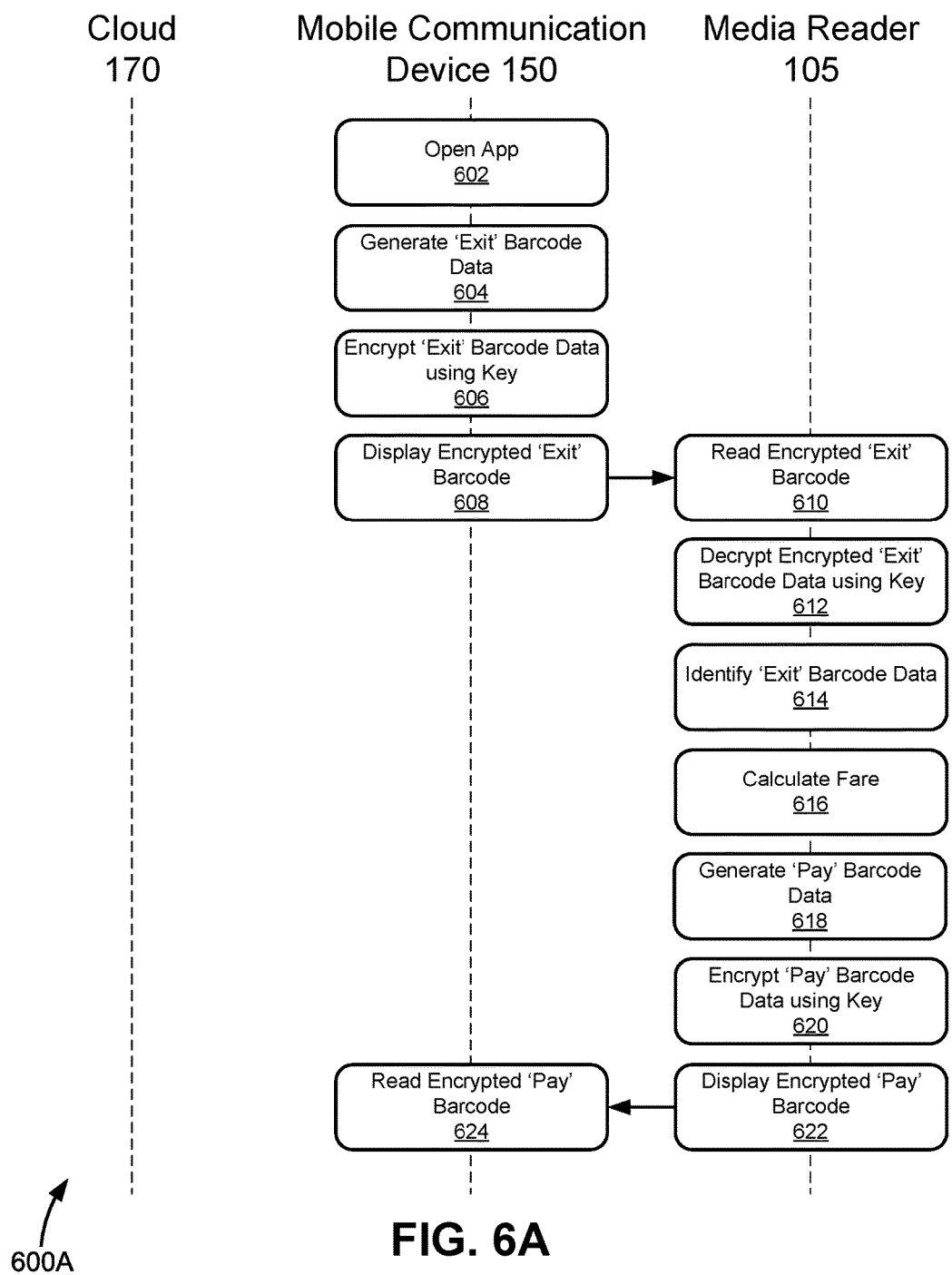
FIGS. 6A and 6B illustrate a method of conducting a secure ticketing transaction by authenticating a transit customer's identity, according to some embodiments of the present disclosure.
Figure 6B:
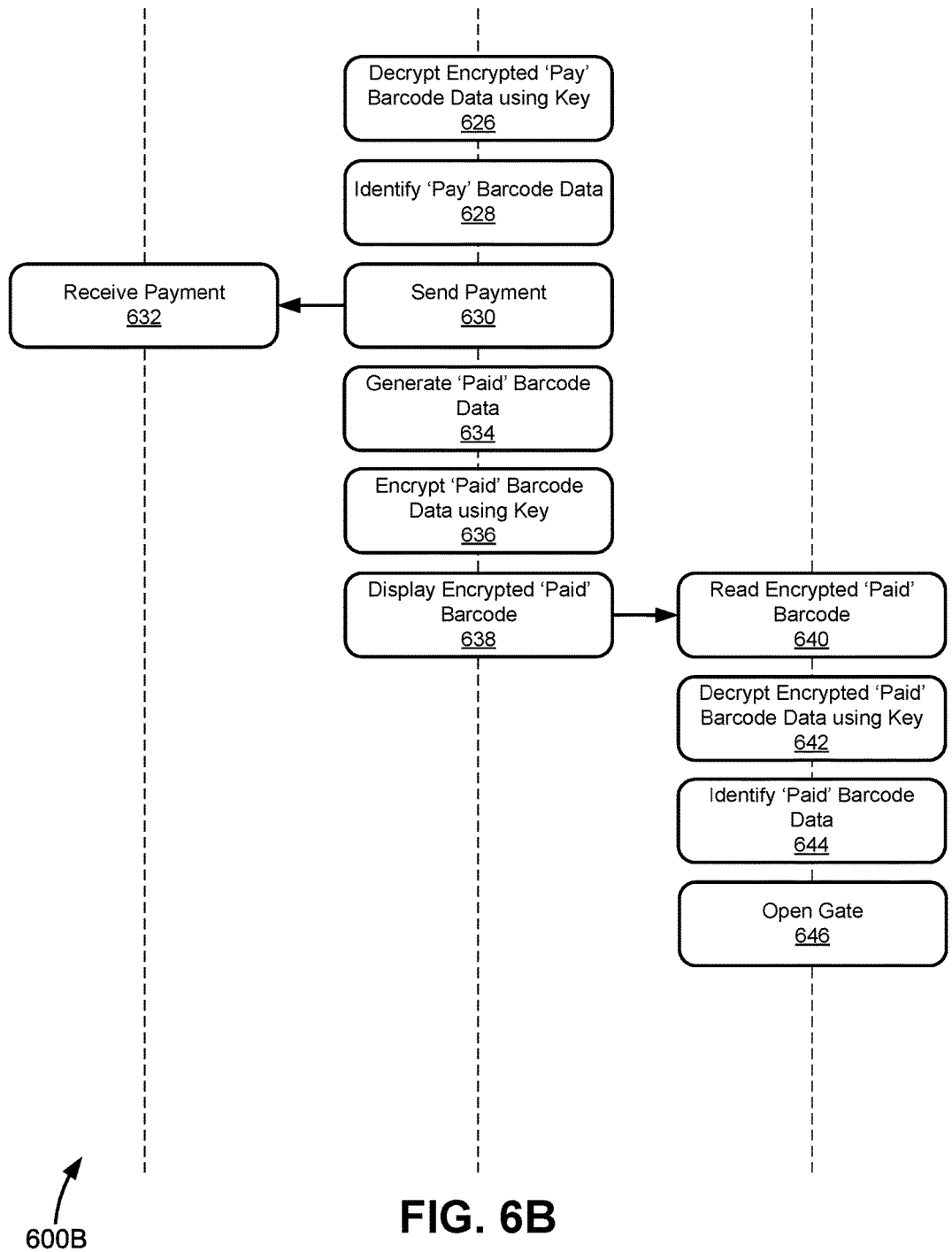
Figure 7:
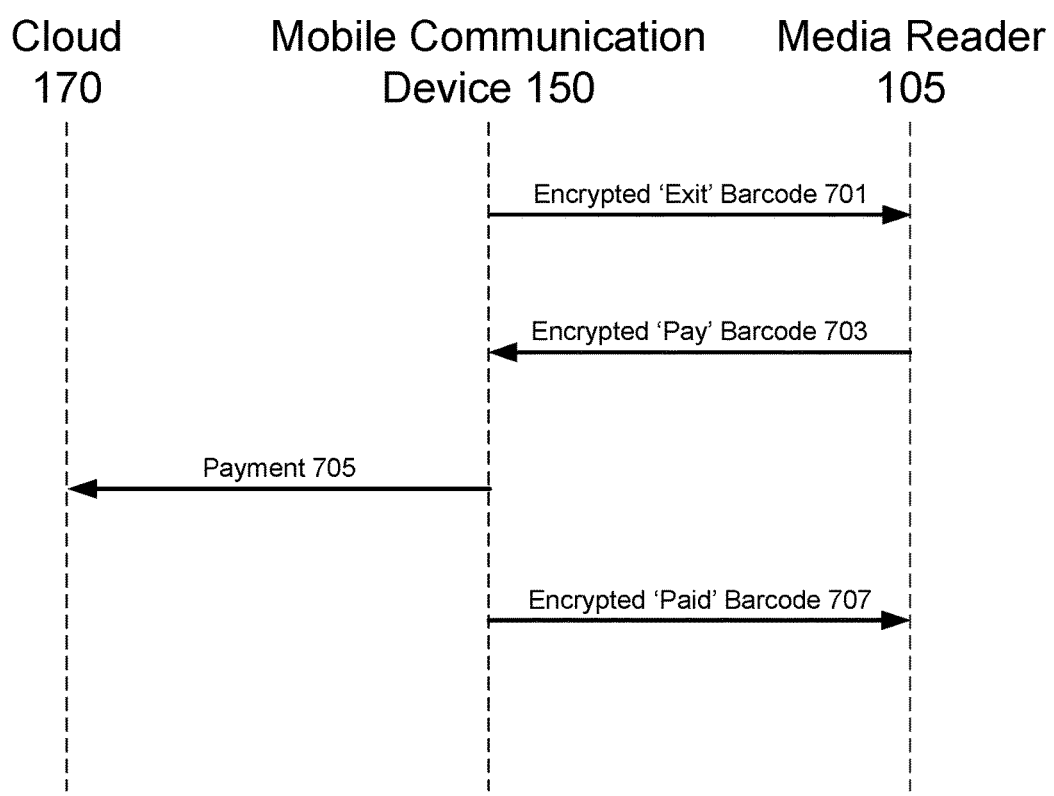
FIG. 7 illustrating a simplified diagram of the information exchanged during performance of a method, according to some embodiments of the present disclosure.

FIGS. 6A and 6B illustrate a method 600 of conducting a secure ticketing transaction by authenticating a transit customer's identity, according to some embodiments of the present disclosure. Specifically, method 600 may allow a transit customer to exit a restricted access area within transit system 100. In some embodiments, method 600 is performed subsequent to method 400. Media reader 105 described in reference to method 600 may be the same or a different media reader than media reader 105 described in reference to method 400. Steps of method 600 need not be performed in the order shown, and not all steps of method 600 need be performed during performance of method 600. In describing steps of method 600, reference will also be made to FIG. 7 illustrating a simplified diagram of the information exchanged during performance of method 600.

At step 602, application 401 is opened by mobile communication device 150. In some embodiments, application 401 may have previously been opened during performance of method 400. At step 604, 'Exit' barcode data (alternatively referred to herein as fourth barcode data) is generated by mobile communication device 150. The 'Exit' barcode data may include the entry transaction. Where mobile communication 150 has received multiple entry transactions, either the most recent entry transaction, the oldest entry transaction, and/or all of the entry transactions may be included in the 'Exit' barcode data. At step 606, the 'Exit' barcode data is encrypted by mobile communication device 150 using key 407. At step 608, encrypted 'Exit' barcode 701 is displayed by mobile communication device 150. At step 610, encrypted 'Exit' barcode 701 is read by media reader 105 using barcode reader 106. In some embodiments, step 610 may be performed concurrently or simultaneously with step 608.

At step 612, the encrypted 'Exit' barcode data is decrypted by media reader 105 using key 407. At step 614, the 'Exit' barcode data is identified by media reader 105. Identifying the 'Exit' barcode data may include comparing the 'Exit' barcode data to a database containing a list of acceptable barcode data that includes the 'Exit' barcode data. Upon identifying the 'Exit' barcode data, media reader 105 may determine the transit customer's identity and may also determine that the transit customer is attempting to conduct a secure ticketing transaction involving an exit from transit system 100. Furthermore, media reader 105 may extract and analyze the data from the entry transaction.

At step 616, a fare is calculated by media reader 105. In some embodiments, the fare is calculated based on the entry location (identified in the entry transaction) and the exit location. To prevent fare abuse and manipulation, where multiple entry transactions are included in the 'Exit' barcode data identifying different entry locations, a fare is calculated for each entry location and the actual fare is determined to be the maximum of the fares. At step 618, 'Pay' barcode data is generated by media reader 105. In some embodiments, the 'Pay' barcode data may indicate the fare. At step 620, 'Pay' barcode data is encrypted by media reader 105 using key 407. At step 622, encrypted 'Pay' barcode 703 is displayed by media reader 105 using barcode display 107. At step 624, encrypted 'Pay' barcode 703 is read by mobile communication device 150. In some embodiments, step 624 may be performed concurrently or simultaneously with step 622. At step 626, the encrypted 'Pay' barcode data is decrypted by mobile communication device 150. At step 628, the 'Pay' barcode data is identified by mobile communication device 150. Identifying the 'Pay' barcode data may include comparing the 'Pay' barcode data to a database containing a list of acceptable barcode data that includes the 'Pay' barcode data. Upon identifying the 'Pay' barcode data, mobile communication device 150 may determine that the transit customer's request to exit transit system 100 was received by media reader 105, and may further determine an amount to be paid (i.e., the fare) based on the 'Pay' barcode data.

At step 630, a payment 705 is sent by mobile communication device 150 to cloud 170. At step 632, payment 705 is received by cloud 170 from mobile communication device 150. In some embodiments, step 632 may be performed concurrently or simultaneously with step 630. At step 634, 'Paid' barcode data (alternatively referred to herein as fifth barcode data) is generated by mobile communication device 150. In some embodiments, the 'Paid' barcode data may indicate successful payment by including a proof of payment received by mobile communication device 150 from cloud 170. At step 636, the 'Paid' barcode data is encrypted by mobile communication device 150 using key 407. At step 638, encrypted 'Paid' barcode 707 is displayed by mobile communication device 150. At step 640, encrypted 'Paid' barcode 707 is read by media reader 105 using barcode reader 106. At step 642, the encrypted 'Paid' barcode data is decrypted by media reader 105.

At step 644, the 'Paid' barcode data is identified by media reader 105. Identifying the 'Paid' barcode data may include comparing the 'Paid' barcode data to a database containing a list of acceptable barcode data that includes the 'Paid' barcode data. Upon identifying the 'Paid' barcode data, media reader 105 may determine the transit customer's identity and may also determine that the transit customer has paid the correct fare. Media reader 105 may analyze the proof of payment to determine that the transit customer is allowed to exit transit system 100. At step 646, the transit customer associated with mobile communication device 150 is allowed to exit the restricted access area. Allowing the transit customer to exit the restricted access area may include removing a physical barrier associated with gate 110 and/or causing an alarm signal to not be activated.

Figure 8:
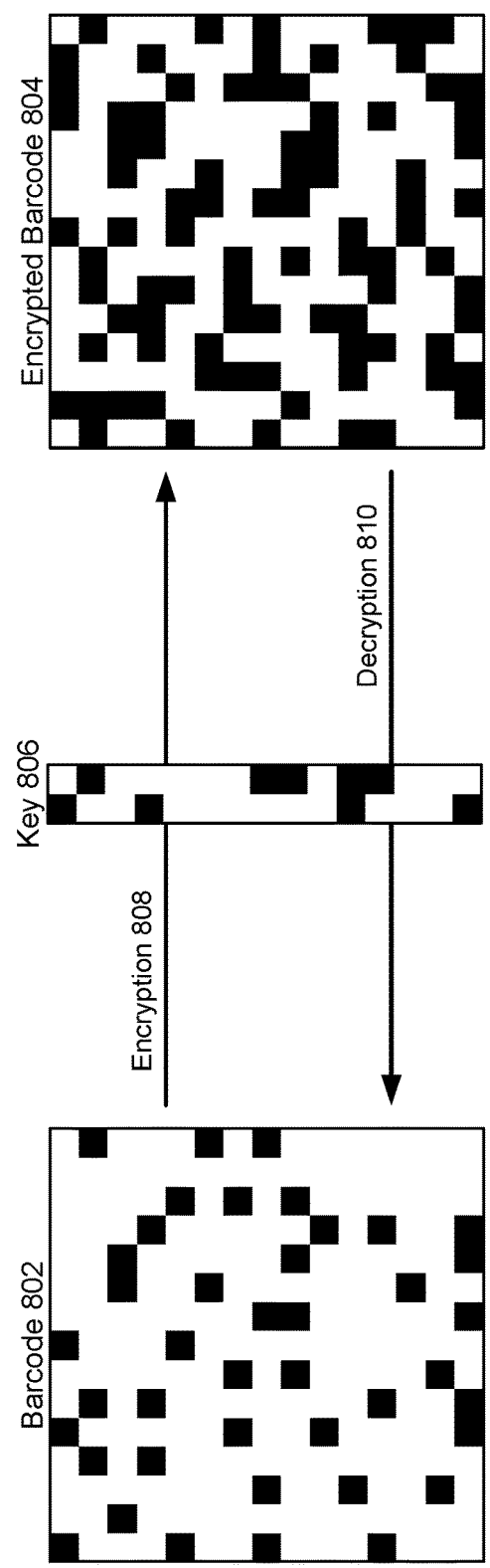
FIG. 8 illustrates an example of a method of barcode encryption and decryption using a key, according to some embodiments of the present disclosure.

FIG. 8 illustrates an example of a method of barcode encryption 808 and decryption 810 using a key 806. In some embodiments, encryption 808 may be performed on a barcode 802 directly or on the underlying data of barcode 802. For example, the underlying data of barcode 802 may be encrypted using key 806 by performing various operations on the underlying data such as, but not limited to, rearranging the underlying data in accordance with key 806, filtering the underlying data in accordance with key 806, modifying the underlying data in accordance with key 806, and the like. After encryption 808, barcode 802 in transformed into encrypted barcode 804. Encrypted barcode 804 may be transformed back into barcode 802 by performing decryption 810 on encrypted barcode 804 directly or on the underlying data of encrypted barcode 804. In some embodiments, encryption 808 and decryption 810 are defined such that barcode 802 is recreated perfectly after decryption 810 of encrypted barcode 804.

Figure 9:
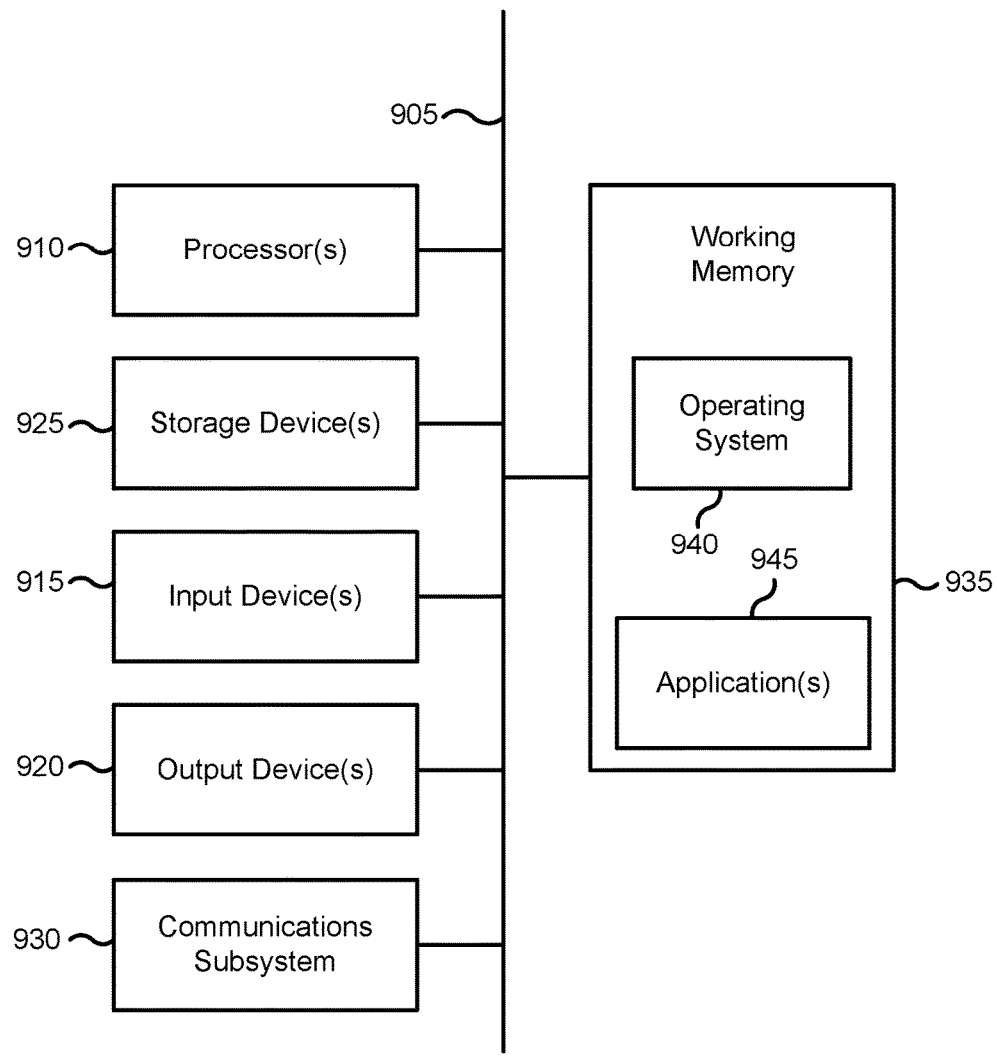
FIG. 9 illustrates a simplified computer system, according to some embodiments of the present disclosure.

FIG. 9 illustrates a simplified computer system 900, according to some embodiments of the present disclosure. Computer system 900 may be incorporated as part of the previously described computerized devices. For example, computer system 900 can represent some of the components of media reader 105, mobile communication device 150, cloud 170, and the like. FIG. 9 provides a schematic illustration of one embodiment of a computer system 900 that can perform the methods provided by various other embodiments, as described herein. FIG. 9 is meant only to provide a generalized illustration of various components, any or all of which may be utilized as appropriate. FIG. 9, therefore, broadly illustrates how individual system elements may be implemented in a relatively separated or relatively more integrated manner.

The computer system 900 is shown comprising hardware elements that can be electrically coupled via a bus 905 (or may otherwise be in communication, as appropriate). The hardware elements may include a processing unit 910, including without limitation one or more general-purpose processors and/or one or more special-purpose processors (such as digital signal processing chips, graphics acceleration processors, and/or the like); one or more input devices 915, which can include without limitation a keyboard, a touchscreen, receiver, a motion sensor, a camera, a smartcard reader, a contactless media reader, and/or the like; and one or more output devices 920, which can include without limitation a display device, a speaker, a printer, a writing module, and/or the like.

The computer system 900 may further include (and/or be in communication with) one or more non-transitory storage devices 925, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 900 might also include a communication interface 930, which can include without limitation a modem, a network card (wireless or wired), an infrared communication device, a wireless communication device and/or chipset (such as a Bluetooth™ device, an 802.11 device, a Wi-Fi device, a WiMax device, an NFC device, cellular communication facilities, etc.), and/or similar communication interfaces. The communication interface 930 may permit data to be exchanged with a network (such as the network described below, to name one example), other computer systems, and/or any other devices described herein. In many embodiments, the computer system 900 will further comprise a non-transitory working memory 935, which can include a RAM or ROM device, as described above.

The computer system 900 also can comprise software elements, shown as being currently located within the working memory 935, including an operating system 940, device drivers, executable libraries, and/or other code, such as one or more application programs 945, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such special/specific purpose code and/or instructions can be used to configure and/or adapt a general purpose computer (or other device) to a special purpose computer that is configured to perform one or more operations in accordance with the described methods.

A set of these instructions and/or code might be stored on a computer-readable storage medium, such as the storage device(s) 925 described above. In some cases, the storage medium might be incorporated within a computer system, such as computer system 900. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 900 and/or might take the form of source and/or installable code, which, upon compilation and/or installation on the computer system 900 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Moreover, hardware and/or software components that provide certain functionality can comprise a dedicated system (having specialized components) or may be part of a more generic system. For example, a risk management engine configured to provide some or all of the features described herein relating to the risk profiling and/or distribution can comprise hardware and/or software that is specialized (e.g., an application-specific integrated circuit (ASIC), a software method, etc.) or generic (e.g., processing unit 910, applications 945, etc.) Further, connection to other computing devices such as network input/output devices may be employed.

Some embodiments may employ a computer system (such as the computer system 900) to perform methods in accordance with the disclosure. For example, some or all of the procedures of the described methods may be performed by the computer system 900 in response to processing unit 910 executing one or more sequences of one or more instructions (which might be incorporated into the operating system 940 and/or other code, such as an application program 945) contained in the working memory 935. Such instructions may be read into the working memory 935 from another computer-readable medium, such as one or more of the storage device(s) 925. Merely by way of example, execution of the sequences of instructions contained in the working memory 935 might cause the processing unit 910 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 900, various computer-readable media might be involved in providing instructions/code to processing unit 910 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 925. Volatile media include, without limitation, dynamic memory, such as the working memory 935. Transmission media include, without limitation, coaxial cables, copper wire and fiber optics, including the wires that comprise the bus 905, as well as the various components of the communication interface 930 (and/or the media by which the communication interface 930 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a magnetic medium, optical medium, or any other physical medium with patterns of holes, a RAM, a PROM, EPROM, a FLASH-EPROM, any other memory chip or cartridge, a carrier wave as described hereinafter, or any other medium from which a computer can read instructions and/or code.

The communication interface 930 (and/or components thereof) generally will receive the signals, and the bus 905 then might carry the signals (and/or the data, instructions, etc. carried by the signals) to the working memory 935, from which the processor(s) 905 retrieves and executes the instructions. The instructions received by the working memory 935 may optionally be stored on a non-transitory storage device 925 either before or after execution by the processing unit 910.

The methods, systems, and devices discussed above are examples. Some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

What is claimed is:

1. A media reader for conducting a secure ticketing transaction at a first location within a transit system, the media reader comprising:
   a barcode reader;
   a barcode display; and one or more processors communicatively coupled to the barcode reader and the barcode display, the one or more processors configured to perform operations including:
  receiving a key for performing encryption or decryption of data;
  reading, from a display of a mobile communication device of a transit customer, an encrypted first barcode to obtain encrypted first barcode data;
  decrypting, using the key, the encrypted first barcode data to obtain first barcode data, the first barcode data indicating a request of the transit customer to enter the transit system at the first location;
  generating second barcode data indicating entry information;
  encrypting, using the key, the second barcode data to obtain encrypted second barcode data;
  displaying an encrypted second barcode containing the encrypted second barcode data; and
  allowing the transit customer to enter the transit system at the first location;
wherein a second media reader at a second location within the transit system is configured to:
  read, from the display of the mobile communication device, an encrypted fourth barcode to obtain encrypted fourth barcode data;
  decrypt, using the key, the encrypted fourth barcode data to obtain fourth barcode data, the fourth barcode data indicating the entry information and a request of the transit customer to exit the transit system at the second location;
  calculate a fare based on the first location and the second location; and
  allow the transit customer to exit the transit system at the second location.

2. The media reader of claim 1, wherein the entry information includes one or more of:
  the first location;
  a current time; and
  an identifier corresponding to the transit customer.

3. The media reader of claim 1, wherein the operations further comprise:
  reading, from the display of the mobile communication device, an encrypted third barcode to obtain encrypted third barcode data; and
  decrypting, using the key, the encrypted third barcode data to obtain third barcode data, the third barcode data indicating that the encrypted second barcode was successfully read by the mobile communication device.

4. The media reader of claim 1, wherein the second media reader is further configured to:
  read, from the display of the mobile communication device, an encrypted fifth barcode to obtain encrypted fifth barcode data; and
  decrypt the encrypted fifth barcode data to obtain fifth barcode data, the fifth barcode data indicating that the fare was successfully paid.

5. The media reader of claim 1, wherein the key is generated remote to the media reader and the mobile communication device.

6. The media reader of claim 1, wherein allowing the transit customer to enter the transit system at the first location includes one or more of:
  removing a physical barrier at the first location; and
  facilitating access through a gateless entry at the first location.

7. A method of conducting a secure ticketing transaction by authenticating a transit customer's identity, the method comprising:
  receiving, by a first media reader at a first location within a transit system, a key for performing encryption or decryption of data;
  reading, by the first media reader from a display of a mobile communication device of a transit customer, an encrypted first barcode to obtain encrypted first barcode data;
  decrypting, by the first media reader using the key, the encrypted first barcode data to obtain first barcode data, the first barcode data indicating a request of the transit customer to enter the transit system at the first location;
  generating, by the first media reader, second barcode data indicating entry information;
  encrypting, by the first media reader using the key, the second barcode data to obtain encrypted second barcode data;
  displaying, by the first media reader, an encrypted second barcode containing the encrypted second barcode data;
  allowing the transit customer to enter the transit system at the first location;
  reading, by a second media reader at a second location within the transit system from the display of the mobile communication device, an encrypted fourth barcode to obtain encrypted fourth barcode data;
  decrypting, by the second media reader using the key, the encrypted fourth barcode data to obtain fourth barcode data, the fourth barcode data indicating the entry information and a request of the transit customer to exit the transit system at the second location;
  calculating a fare based on the first location and the second location; and
  allowing the transit customer to exit the transit system at the second location.

8. The method of claim 7, wherein the entry information includes one or more of:
  the first location;
  a current time; and
  an identifier corresponding to the transit customer.

9. The method of claim 7, further comprising:
  reading, by the first media reader from the display of the mobile communication device, an encrypted third barcode to obtain encrypted third barcode data; and
  decrypting, by the first media reader using the key, the encrypted third barcode data to obtain third barcode data, the third barcode data indicating that the encrypted second barcode was successfully read by the mobile communication device.

10. The method of claim 7, further comprising:
  reading, by a second media reader at a second location within the transit system from the display of the mobile communication device, an encrypted fifth barcode to obtain encrypted fifth barcode data; and
  decrypting, by the second media reader using the key, the encrypted fifth barcode data to obtain fifth barcode data, the fifth barcode data indicating that the fare was successfully paid.

11. The method of claim 7, wherein the key is generated remote to the first media reader and the mobile communication device.

12. The method of claim 7, wherein allowing the transit customer to enter the transit system at the first location includes one or more of:
  removing a physical barrier at the first location; and facilitating access through a gateless entry at the first location.

13. A non-transitory computer-readable medium comprising instructions that, when executed by one or more processors, cause the one or more processors to perform operations comprising:

receiving, by a first media reader at a first location within a transit system, a key for performing encryption or decryption of data;

reading, by the first media reader from a display of a mobile communication device of a transit customer, an encrypted first barcode to obtain encrypted first barcode data;

decrypting, by the first media reader using the key, the encrypted first barcode data to obtain first barcode data, the first barcode data indicating a request of the transit customer to enter the transit system at the first location;

generating, by the first media reader, second barcode data indicating entry information;

encrypting, by the first media reader using the key, the second barcode data to obtain encrypted second barcode data;

displaying, by the first media reader, an encrypted second barcode containing the encrypted second barcode data;

allowing the transit customer to enter the transit system at the first location;

reading, by a second media reader at a second location within the transit system from the display of the mobile communication device, an encrypted fourth barcode to obtain encrypted fourth barcode data;

decrypting, by the second media reader using the key, the encrypted fourth barcode data to obtain fourth barcode data, the fourth barcode data indicating the entry information and a request of the transit customer to exit the transit system at the second location;

calculating a fare based on the first location and the second location; and allowing the transit customer to exit the transit system at the second location.

14. The non-transitory computer-readable medium of claim 13, wherein the entry information includes one or more of:

the first location;

a current time; and an identifier corresponding to the transit customer.

15. The non-transitory computer-readable medium of claim 13, wherein the operations further comprise:

reading, by the first media reader from the display of the mobile communication device, an encrypted third barcode to obtain encrypted third barcode data; and decrypting, by the first media reader using the key, the encrypted third barcode data to obtain third barcode data, the third barcode data indicating that the encrypted second barcode was successfully read by the mobile communication device.

16. The non-transitory computer-readable medium of claim 13, wherein the operations further comprise:

reading, by a second media reader at a second location within the transit system from the display of the mobile communication device, an encrypted fifth barcode to obtain encrypted fifth barcode data; and decrypting, by the second media reader using the key, the encrypted fifth barcode data to obtain fifth barcode data, the fifth barcode data indicating that the fare was successfully paid.

17. The non-transitory computer-readable medium of claim 13, wherein the key is generated remote to the first media reader and the mobile communication device.

* * * * *